United States Patent
Gernand et al.

(10) Patent No.: US 7,048,279 B2
(45) Date of Patent: May 23, 2006

(54) LAMINATED CARRIER GASKET WITH OFF-SET ELASTOMERIC SEALING

(75) Inventors: Erich Gernand, Clarksville, TN (US); Daniel J. Vialard, Novi, MI (US); Todd M. Willis, Walled Lake, MI (US)

(73) Assignee: Federal-Mogul World Wide, Inc., Southfield, MI (US)

(*) Notice: Subject to any disclaimer, the term of this patent is extended or adjusted under 35 U.S.C. 154(b) by 13 days.

(21) Appl. No.: 10/848,784

(22) Filed: May 19, 2004

(65) Prior Publication Data
US 2005/0006857 A1    Jan. 13, 2005

Related U.S. Application Data

(60) Provisional application No. 60/471,999, filed on May 20, 2003.

(51) Int. Cl.
*F02F 11/00* (2006.01)
(52) U.S. Cl. ............ 277/596; 277/595; 277/642; 277/649
(58) Field of Classification Search ........ 277/591–596, 277/612, 649, 641, 642
See application file for complete search history.

(56) References Cited

U.S. PATENT DOCUMENTS

| | | |
|---|---|---|
| 2,087,430 A | 7/1937 | Cummins |
| 3,170,701 A | 2/1965 | Hoover |
| 3,215,442 A | 11/1965 | Papenguth |
| 3,490,776 A | 1/1970 | Avery |
| 4,331,336 A | 5/1982 | Czernik et al. |
| 4,765,634 A | 8/1988 | Kobayashi et al. |
| 4,776,601 A | 10/1988 | Yamada |
| 4,819,953 A | 4/1989 | Joh |
| 4,976,225 A | 12/1990 | Stang et al. |
| 5,033,189 A | 7/1991 | Desverchere et al. |
| 5,145,190 A | 9/1992 | Boardman |
| 5,226,663 A | 7/1993 | Miyaoh |
| 5,267,740 A | 12/1993 | Stritzke |
| 5,322,299 A * | 6/1994 | Terai ............... 277/596 |
| 5,341,779 A | 8/1994 | Chen et al. |
| 5,700,017 A | 12/1997 | Tensor |
| 6,193,237 B1 | 2/2001 | Schweiger et al. |
| 6,371,489 B1 | 4/2002 | Combet et al. |
| 6,508,474 B1 | 1/2003 | Kinoshita |
| 6,575,473 B1 | 6/2003 | Sugimoto et al. |

* cited by examiner

Primary Examiner—Michael Trettel
(74) Attorney, Agent, or Firm—Dickinson Wright PLLC

(57) ABSTRACT

A gasket assembly is formed at least two carrier layers laminated together and formed with at least one opening through the carrier corresponding to openings across a parting plane of two members to be sealed. an elastomeric seal is molded to the carrier to define sealing beads on opposite sides of the carrier adjacent the opening with respective contact surfaces which engage the members to be scaled. The sealing contact surfaces are asymmetrically arranged contact surfaces are asymmetrically arranged relative to one another across the carrier to accommodate associated misalignment of the openings of the members to be sealed across the parting plane.

13 Claims, 3 Drawing Sheets

LAMINATED CARRIER GASKET WITH OFF-SET ELASTOMERIC SEALING

BACKGROUND OF THE INVENTION

This application claims priority to U.S. Provisional Patent Application 60/471,999, filed May 20, 2003.

1. Technical Field

This invention relates generally to gaskets for sealing openings, and more particularly to those having an elastomeric seal bonded to a carrier.

2. Related Art

Gaskets are typically used to seal around fluid openings communicating between two clamped components, such as an intake manifold and a cylinder head. A common approach to forming such gaskets is to employ a rigid carrier plate fabricated of either metal or plastic formed with one or more openings corresponding to one or more openings to be sealed by the gasket. A sealing bead is subsequently molded to the carrier in surrounding relation to the gasket opening to seal the joint against leakage of fluid.

In some applications, it occurs that the openings at the joint of the two members do not match up perfectly and/or may not be of the same size. Consequently, under clamping loads, non-uniform forces are applied to the seal bead and/or carrier which may cause them to fail prematurely, resulting in warranty issues.

It is an object of the present invention to provide a gasket which overcomes or greatly minimizes the foregoing limitations of the prior art gaskets.

SUMMARY OF THE INVENTION AND ADVANTAGES

The present invention provides a gasket assembly having a laminated carrier, preferably fabricated of metal layers or plates, which are separately formed and then stacked and joined together. The carrier layers are each formed with an opening that, when the layers are stacked and joined, are aligned coaxially with one another to provide an opening through the gasket. Radially outwardly of each opening the layers are each formed with an annular sealing channel bounded by a radial inner wall and a radial outer wall. The channels extend at least in part through the respective layers, such that there is open communication between the channel of one layer and the channel of the other layer. The channels are asymmetrically arranged relative to one another, such that the inner annular wall of one channel does not line up about its entire circumference with the inner radial wall of the other channel in the axial direction of the carrier opening. The same relationship exists with respect to the radially outer walls. An elastomeric seal material is molded into the channels and united across the layers through the open communication regions of the channels. The elastomeric material forms a sealing bead on one side of the laminated carrier projecting above the axially outer surface of the one carrier layer which is asymmetric with respect to a sealing bead formed on the opposite side of the laminated carrier projecting below the axially outer surface of the other carrier layer.

Such a laminated carrier formed with asymmetric sealing channels and asymmetric sealing beads enables the gasket assembly to be successfully used in applications where the openings of the members being clamped across the parting plane in which the gasket is installed are themselves asymmetrical. Such a gasket enables one of the sealing beads to be tailored to the particular sealing needs of one of the members being clamped on one side of the parting plane, whereas the other sealing bead can be tailored to the specific needs of the other member being clamped in order to accommodate whatever asymmetry may be present across the seal joint. In this way, when the seal assembly is clamped in use, it is not subjected to unbalanced or irregular loading due to the asymmetry of the members being clamped, but rather tailored to accommodate such asymmetries.

DETAILED DESCRIPTION OF A PREFERRED EMBODIMENT

Figure 1:
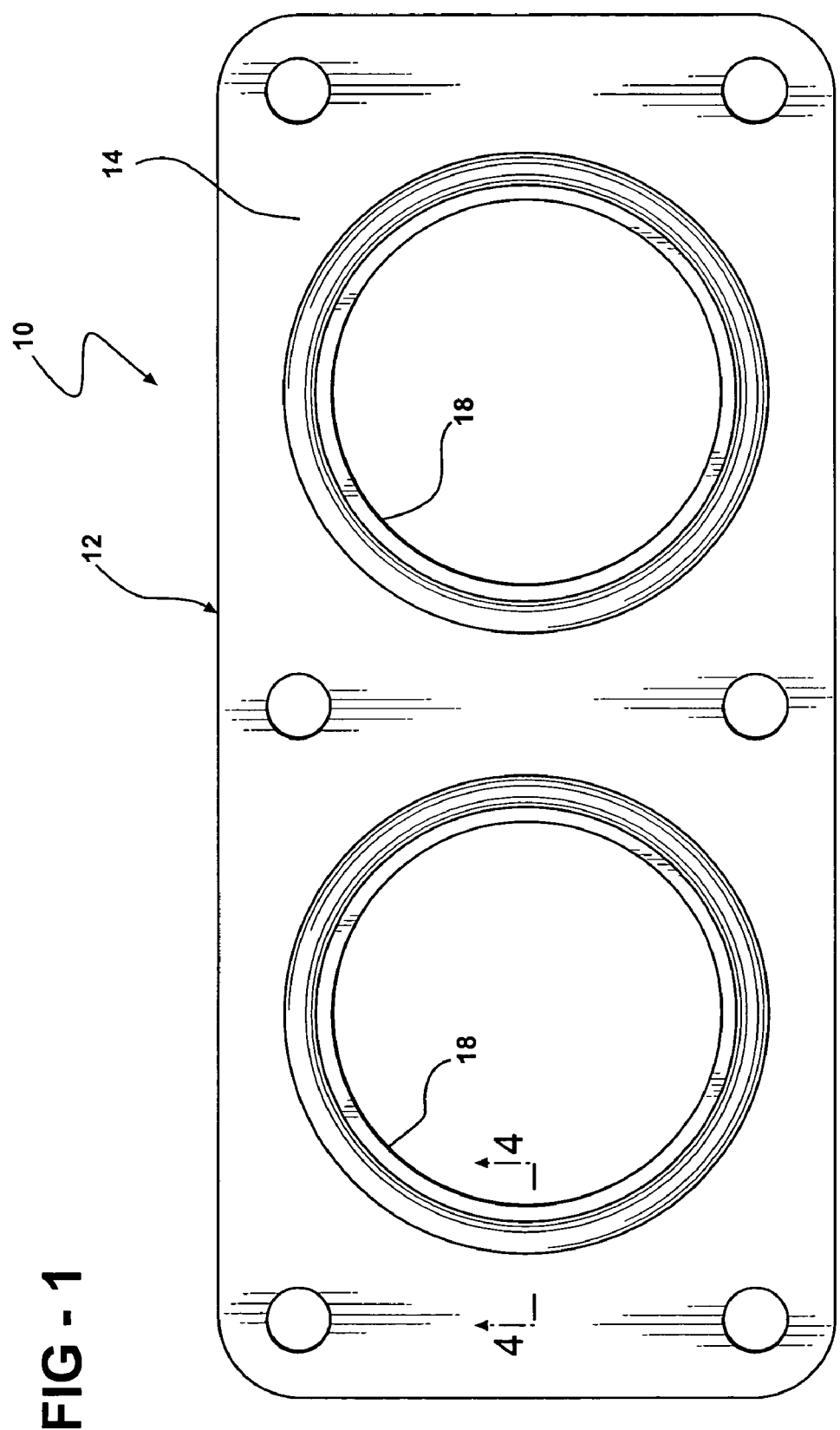
FIG. 1 is a plan view of a gasket assembly according to the invention.

A gasket assembly constructed according to a first presently preferred embodiment of the invention is generally indicated at 10 in FIG. 1. It includes a laminated carrier 12 fabricated of a first carrier layer 14 on a second carrier layer 16. The carrier layers 14, 16 are preferably separately formed of metal, although the invention contemplates plastics, ceramics, and other suitable materials as being appropriate for the carrier layers. The first carrier layer 14 is formed with at least one and has shown two openings 18 that correspond to openings 20 formed in a first member 22 to be clamped. The second layer 16 is formed of at least one and as illustrated two openings 24 which correspond to openings 26 and a second member 28. The first member 22 may comprise, for example, an intake manifold of an internal combustion engine, and the second member 28 may comprise, for example, a cylinder head of the engine to which the intake manifold is mounted, such that the respective openings 20,26 communicate across a parting plane or parting faces of the members 22,28. The openings 20,26 of the members 22,28 are asymmetrical with one another, at least in relation to their sealing surfaces surrounding the openings. The gasket assembly 10 is clamped in known manner, such as by bolting, between the members 22,28 and serves to seal the joint between the openings 20,26 against the leakage of fluid. As explained in greater detail below, the gasket assembly 10 is specifically designed to accommodate the asymmetrical relationship between the openings 20,26 of the members 22,28 across the joint so as to provide a high integrity seal that can accommodate the loading on the gasket imposed by the asymmetrical relationship without impairing the integrity of the seal or stressing or breaking the carrier.

Figure 2:
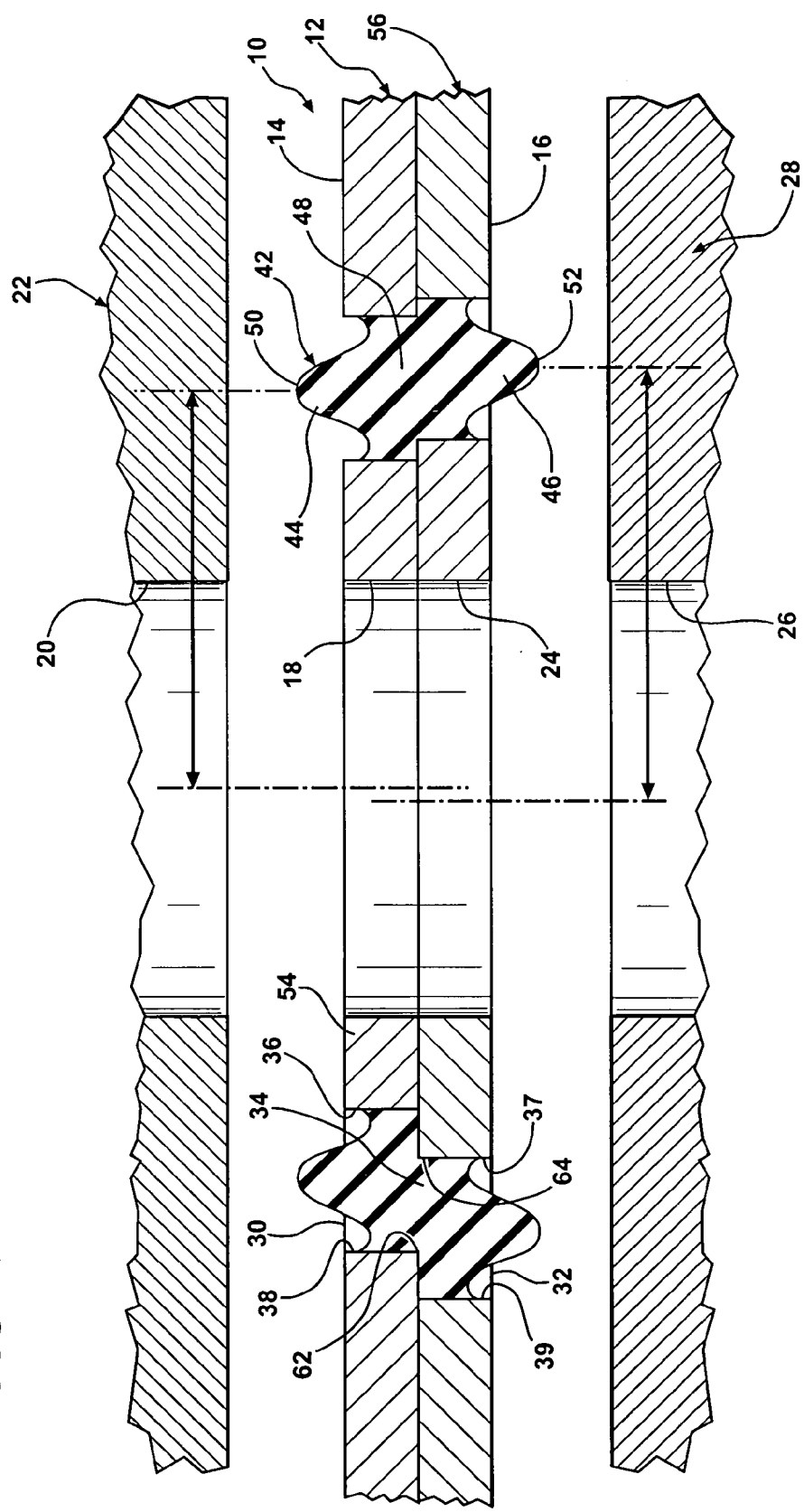
FIG. 2 is an enlarged cross-sectional view taken along lines 2—2 of FIG. 1.

As illustrated best in FIG. 2, the individual carrier layers 14,16 are stacked upon one another in laminated fashion and are preferably joined in any suitable manner, such as by rivets, weldments, adhesives, pull tabs, or the like. The openings 18,24 formed in the carrier layers 14,16 are aligned concentrically about a common axis A. Preferably, the openings 18,24 are of the same size, such that the walls of the openings are in axial alignment with one another about the axis A.

Radially outward of each opening 18,24 the carrier layers 14,16 are each formed with a sealing channel 30,32 which encircle the respective openings 18,24 in the carrier layers 14,16. The sealing channels 30,32 are asymmetrical relative to one another, such that they only partially overlap one another across an interface 34 between the carrier layers 14,16. In other words, the sealing channel 30 of one layer 14 is not identically configured to the sealing channel 32 of the other layer 16 in both shape and orientation, but the channels 30,32 are offset asymmetrically corresponding to the asymmetric requirements of the openings of the first and second members 22,28. Consequently, while the channels 30,32 are in open communication with one another across the interface 34 in part, radially inner 36,37 and outer 38,39 boundary walls of the channels 30,32 are not axially aligned about their respective perimeters, such that one is offset radially outwardly or inwardly relative to the other as illustrated in FIG. 2. In the present embodiment, the sealing channels 30,32 are each circular or near circular. The lower sealing channel 32 is radially larger than the upper sealing channel 30. In addition, the respective axes of the upper and lower channels 30,32 are offset, lending to another degree of asymmetry. Such asymmetry is accounted for by the requirements of a given application which, in the present example, calls for radially different and offset upper and lower sealing surfaces of the seal assembly.

Following the formation of the individual sealing channels 30,32 in their respective separate carrier layers 14,16, and following the joining of the layers 14,16 together, an elastomeric sealing material 42 is molded into the sealing channel 30,32 to form sealing beads 44,46 on opposite sides of the carrier 12 encircling the respective openings 18,24 of the carrier 12 for sealing the associated openings 20,26 of the first and second members 22,28. As shown best in FIG. 2, the sealing material 42 forming the opposing sealing beads 44,46 is formed as one molded piece and is connected across the sealing channels 30,32 of the individual carrier layers 14,16. As best shown in FIG. 2, the sealing beads 44,46 extend axially outwardly from a central body 48 of the sealing material 42 and outwardly of their respective channels 30,32 to an outer-most sealing contact surface 50,52 of the sealing beads 44,46, respectively. The sealing beads 44,46 trace the same general path as that of their sealing channels 30,32, and thus the sealing beads 44,46 like the channels 30,32, are asymmetrical such that the sealing contact surfaces 50,52 do not align axially with one another on opposite sides of the carrier along the full trace of the sealing beads. This asymmetric relationship enables the sealing beads 44,46 to accommodate the asymmetric openings 20,26 of the first and second members 22,28 and thus are formed in accordance with requirements of the asymmetric openings 20,26 of the first and second members 22,28.

Figure 3:
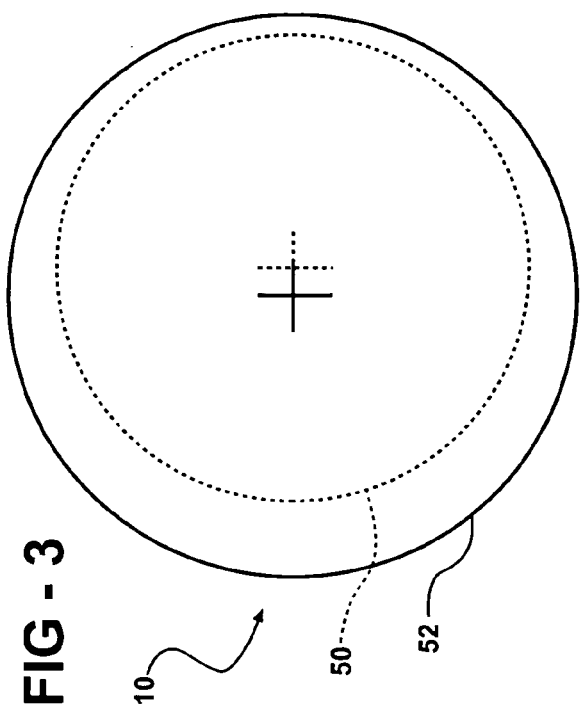
FIG. 3 is a diagrammatic view of a trace of the sealing bend contact surfaces, superimposed upon one another, illustrating their asymmetry.

FIG. 3 represents a trace of the sealing contact surfaces 50,52 of the opposing sealing beads 44,46 further showing the asymmetric relationship of the sealing beads 44,46. It will be seen that the lower sealing bead 46 has a greater diameter than that of the upper sealing bead 44, and that their axes are offset. The particular asymmetric relationship between the sealing bead contact surfaces 50,52 will be determined by the particular requirements of a given sealing application based on the asymmetric relationship of the mating openings 20,26 of the first and second members 22,28 to be sealed.

As illustrated in FIG. 2, the sealing beads 44,46 each have a profile in cross-section that may be the same or different from one another. The particular profile will be determined by the requirements of a particular sealing application, with the one illustrated being representative of just one possibility. Those skilled in the art will appreciate that the asymmetric relationship of the upper and lower sealing beads 44,46 can be applied equally to sealing beads of whatever cross-sectional configuration is required of a particular sealing bead, and whether the profiles are the same or different between the sealing beads.

The elastomeric material for the sealing beads 44,46 may be any of a number of organic polymeric elastomer materials now used, or in the future developed suitable for a particular sealing application for which the gasket 10 will be used. Some examples include rubber, NBR, or other elastomers. The invention further contemplates the possibility of co-molding two materials if called for by a given application, such that one of the sealing beads may be made of a different elastomeric material than that of the other sealing bead to support different loading, stress, or other conditions, if called for.

Figure 4:
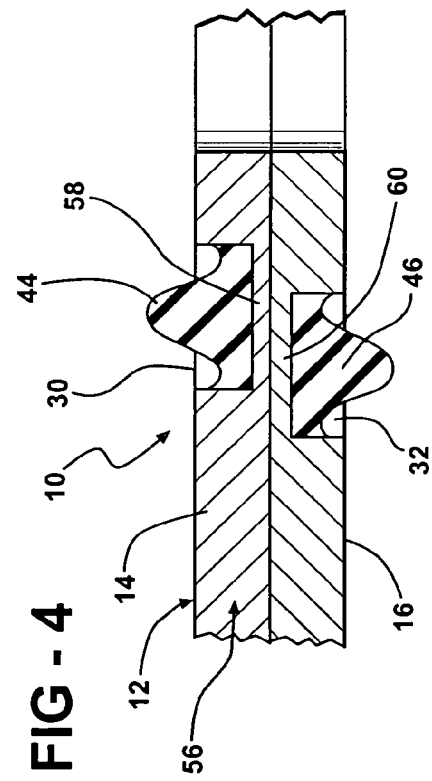
FIG. 4 is a fragmentary cross-sectional view taken along lines 4—4 of FIG. 2.

FIG. 4 illustrates the connection of the carrier layers across the sealing channel. With the introduction of the sealing channel 30,32 in the carrier layers 14,16, an inner annular ring 54 of the carrier material 12 is defined radially inwardly of the sealing beads, but is connected to the main carrier body 56 through bridging portions 58,60 of the carrier layers 14,16 extending through the body 48 of the elastomer seal 42. The bridging portions 58,60 are interrupted by open regions 62,64 (FIG. 2) to establish open communication between the sealing channels of the carrier layers 14,16 for one piece molding of the seal material 42.

Figure 5:
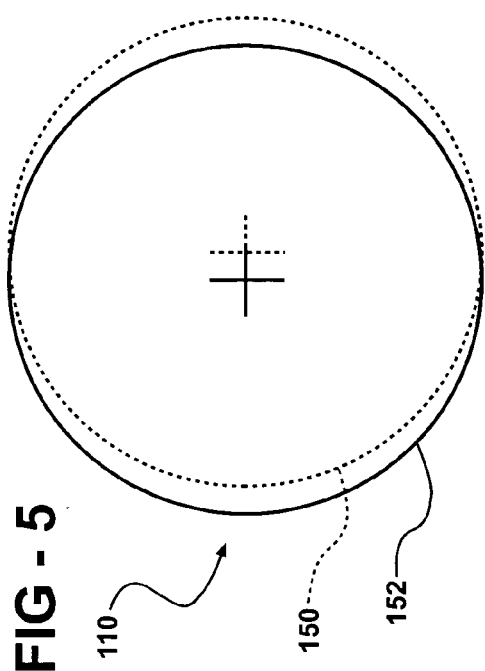
FIG. 5 is a view like FIG. 3, but of an alternative asymmetrical arrangement.
Figure 6:
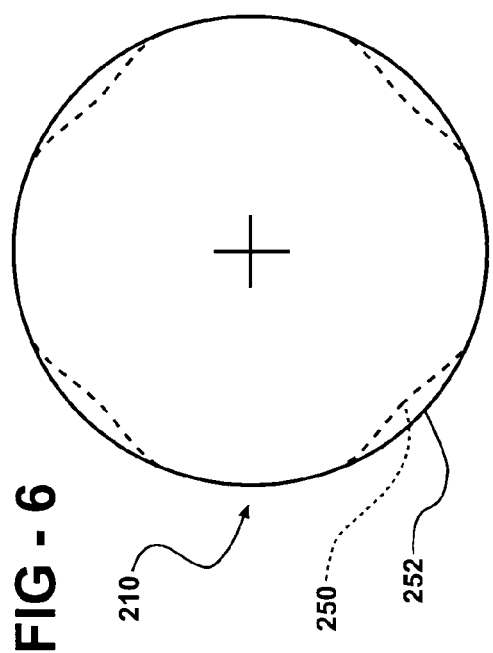
FIG. 6 is a view like FIG. 3, but of still a further alternative asymmetric arrangement.

FIGS. 5 and 6 illustrate the traces of asymmetric contact surfaces 150, 152, 250, 252, respectively opposing sealing bends 144, 146, 244, 246 of two exemplary alternative embodiments of the seal assembly 110 and 210, respectively. The sealing bead traces of FIG. 5 are an example of where the sealing beads 144, 146, 244, 246 may be of identical size and shape, but whose axes are offset so that there is axial misalignment of the sealing beads to compensate for corresponding misalignment in the members to be scaled. the traces of FIG. 6 illustrate an example where one of the traces is circular, while the other trace is non-circular. Of course, those skilled in the art will recognized that a virtual endless number of combinations of asymmetrical seal beads are possible, governed by the requirements of a given application. Accordingly, those embodiments described above are only exemplary of numerous other asymmetrical bead arrangements, which are contemplated by the present invention.

It is to be understood that other embodiments of the invention, which accomplish the same function, are incorporated herein within the scope of any ultimately allowed patent claims.

The invention claimed is:

1. A gasket assembly comprising:
a first carrier layer;
a second carrier layer;
said first and second carrier layers being separately formed;
said first and second carrier layers being laminated to define a laminated carrier;
at least one aligned opening formed in said carrier;
an elastomeric seal formed on said carrier having a first sealing bead surrounding said opening on one side of said carrier and a second sealing bead surrounding said opening on an opposite side of said carrier;

said sealing beads defining respective sealing contact surfaces spaced axially outwardly of the opposite sides of said carrier; and said sealing contact surfaces being asymmetrical relative to on another; and wherein said carrier includes a sealing channel spaced outwardly of said opening and in which said seal is formed.

2. The assembly of claim 1 wherein said sealing channel extends, at least in part, completely through said carrier layers.

3. The assembly of claim 2 wherein said seal extends fully through said sealing channel to said opposite sides of said carrier.

4. The assembly of claim 3 wherein said sealing channel includes a sealing channel portion formed in each of said carrier layers, and where said sealing channel portions are in open communication with one another but are asymmetrically arranged relative to one another.

5. The assembly of claim 4 wherein the sealing channel portions have a trace that is essentially the same trace as that of the sealing bead associated with the respective sealing channel portion.

6. The assembly of claim 1 wherein at least one of the sealing contact surfaces is eccentrically arranged relative to said opening in said carrier.

7. The assembly of claim 2 wherein said seal is formed as one continuous piece between said sealing beads on said opposite side of said carrier.

8. The assembly of claim 2 wherein said sealing channel is interrupted by a plurality of bridging portions.

9. The assembly of claim 1 wherein said sealing bead on one side of said carrier is eccentrically arranged relative to said sealing bead on the opposite side of said carrier.

10. The assembly of claim 1 wherein said sealing bead on one side of said carrier has a circumferential trace that is different than that of a trace of said sealing bead on the opposite side of said carrier.

11. The assembly of claim 1 wherein said sealing bead on one side of said carrier has other than a mirrored relationship with said sealing bead on the opposite side of said carrier.

12. A method of forming a seal between two members across a parting plane to seal an opening communicating between the members across the parting plane, and where the opening communicating between the members are asymmetrically arranged relative to one another, the method including:

preparing a gasket assembly having at least two separately formed carrier layers joined to define a laminated carrier having at least one opening therethrough corresponding in location to the opening of the members to be sealed across the parting plane, molding an elastomeric seal to the laminated carrier to define sealing beads on opposite sides of the laminated carrier surrounding the opening of the laminated carrier, the sealing beads extending axially outwardly of the opposite sides of the laminated carrier to define opposing sealing bead contact surfaces; and wherein the sealing bead contact surfaces are formed in asymmetric relationship to one another in accordance with the asymmetric relationship of the openings of the members to be sealed across the parting plane, and including forming a sealing channel through the carrier adjacent the opening in the carrier and molding the seal in the channel.

13. The method of claim 12 including forming the carrier with bridging portions extending across the channel.

* * * * *

UNITED STATES PATENT AND TRADEMARK OFFICE
CERTIFICATE OF CORRECTION

PATENT NO. : 7,048,279 B2  Page 1 of 1
APPLICATION NO. : 10/848784
DATED : May 23, 2006
INVENTOR(S) : Erich Gernand, Daniel J. Vialard and Todd M. Willis It is certified that error appears in the above-identified patent and that said Letters Patent is hereby corrected as shown below:

On Title Page, Item (57)

| Column | Line | |
|---|---|---|
| Abstract | 1 | Replace " formed at least " with -- formed from at least -- |
| Abstract | 4 | Replace "an elastomeric" with -- An elastomeric -- |
| Abstract | 8 | Replace "scaled" with -- sealed -- |
| 5 | 7 | Replace "relative to on another" with -- relative to one another -- |

Signed and Sealed this

Twenty-eighth Day of November, 2006

JON W. DUDAS
*Director of the United States Patent and Trademark Office*